(12) United States Patent
King, II (10) Patent No.: US 8,991,772 B2
(45) Date of Patent: Mar. 31, 2015

(54) INSTRUMENT PANEL ASSEMBLY

(75) Inventor: Charles Joseph King, II, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 209 days.

(21) Appl. No.: 13/224,892

(22) Filed: Sep. 2, 2011

(65) Prior Publication Data
US 2013/0058014 A1  Mar. 7, 2013

(51) Int. Cl.
*G12B 9/00* (2006.01)
*B60R 11/02* (2006.01)
*B60R 11/00* (2006.01)

(52) U.S. Cl.
CPC ......... *B60R 11/0211* (2013.01); *B60R 11/0258* (2013.01); *B60R 2011/0005* (2013.01); *B60R 2011/0047* (2013.01)
USPC ...................... 248/27.1; 248/200; 248/220.21; 248/205.1; 296/70; 361/679.01

(58) Field of Classification Search
USPC ............. 248/27.1, 200, 205.1, 917, 918, 352, 248/694, 214, 218.4, 220.21; 701/200–214; 180/90; 296/70, 72, 37.8, 37.12, 24.34; 361/679.01, 686, 681, 728, 731, 733
See application file for complete search history.

(56) References Cited

U.S. PATENT DOCUMENTS

| | | | | |
|---|---|---|---|---|
| 4,194,585 A * | 3/1980 | Prince | ............................. | 180/90 |
| 5,324,203 A * | 6/1994 | Sano et al. | ...................... | 439/34 |
| 5,823,602 A * | 10/1998 | Kelman et al. | .................. | 296/70 |
| 5,857,726 A * | 1/1999 | Yokoyama et al. | ............. | 296/70 |
| 5,865,403 A * | 2/1999 | Covell | ......................... | 248/27.1 |
| 6,040,760 A | 3/2000 | Kataoka et al. | | |
| 6,048,020 A * | 4/2000 | Gronowicz et al. | ............. | 296/70 |
| 6,130,727 A | 10/2000 | Toyozumi | | |
| 6,428,072 B1 * | 8/2002 | Moore | ........................ | 296/24.34 |
| 6,511,115 B2 * | 1/2003 | Koepff et al. | ............... | 296/24.34 |
| 6,529,381 B1 * | 3/2003 | Schoenfish | .................... | 361/725 |
| 6,651,936 B2 * | 11/2003 | Upson et al. | .................. | 248/27.3 |
| 6,705,671 B1 * | 3/2004 | Glovatsky et al. | ........ | 296/193.02 |
| 6,727,606 B2 | 4/2004 | Schopp et al. | | |
| 6,939,155 B2 | 9/2005 | Postrel | | |
| 6,984,784 B2 | 1/2006 | Nagasaka et al. | | |
| 6,989,993 B2 | 1/2006 | Amari et al. | | |
| 7,021,691 B1 * | 4/2006 | Schmidt et al. | .................. | 296/70 |
| 7,264,295 B2 * | 9/2007 | Vander Sluis et al. | .......... | 296/70 |
| 7,313,477 B1 * | 12/2007 | Laverick et al. | ............... | 701/472 |
| 7,430,110 B2 * | 9/2008 | Quilling, II | .............. | 361/679.01 |
| 7,623,958 B1 * | 11/2009 | Laverick et al. | ............... | 701/444 |
| 7,650,230 B1 * | 1/2010 | Laverick et al. | ............... | 701/491 |
| 7,706,142 B2 | 4/2010 | Noisternig et al. | | |
| 7,926,845 B2 * | 4/2011 | Sato | ............................. | 280/779 |
| 2002/0195831 A1 * | 12/2002 | Hogan et al. | ................ | 296/37.12 |
| 2003/0094831 A1 * | 5/2003 | Kondo et al. | .................... | 296/70 |
| 2004/0124317 A1 * | 7/2004 | Wallaker | ....................... | 248/27.1 |
| 2005/0029409 A1 * | 2/2005 | Tagle | ............................ | 248/27.1 |
| 2007/0278368 A1 * | 12/2007 | Dunphy et al. | ................ | 248/201 |
| 2008/0143892 A1 | 6/2008 | Lytell | | |
| 2009/0024275 A1 * | 1/2009 | Hayes et al. | .................... | 701/36 |
| 2010/0128890 A1 | 5/2010 | Boulia | | |

\* cited by examiner

*Primary Examiner* — Monica Millner
(74) *Attorney, Agent, or Firm* — Gifford, Krass, Sprinkle, Anderson & Citkowski, P.C.

(57) ABSTRACT

A multimedia assembly and an instrument panel assembly for use in an automotive vehicle are provided. The multimedia assembly includes a multimedia device and an auxiliary device. The multimedia device has a faceplate which is disposed on the outer surface of the instrument panel so as to be exposed to the cabin space of the vehicle. The auxiliary device is disposed beneath the multimedia device and hidden behind the outer surface of the instrument panel of the vehicle.

10 Claims, 6 Drawing Sheets

INSTRUMENT PANEL ASSEMBLY

FIELD OF THE INVENTION

The invention relates to a multimedia assembly for use in an automotive vehicle. Specifically, the multimedia assembly includes a multimedia device and an auxiliary device mounted beneath the multimedia device and hidden behind the outer surface of the instrument panel.

BACKGROUND OF THE INVENTION

Automotive vehicles may be equipped with a multimedia device. The multimedia device includes a faceplate. The faceplate typically includes a display screen and a plurality of inputs. The multimedia device is operable to provide various multimedia applications and functions. For instance, the multimedia device may be equipped to provide navigation features or satellite radio, AM/FM radio, and the like. The multimedia device is manufactured by a third party and incorporated into the vehicle by the automotive manufacturer. Accordingly, modifying an existing multimedia device to include various other functions and applications requires an auxiliary device having additional hardware and electrical components.

Figure 1:
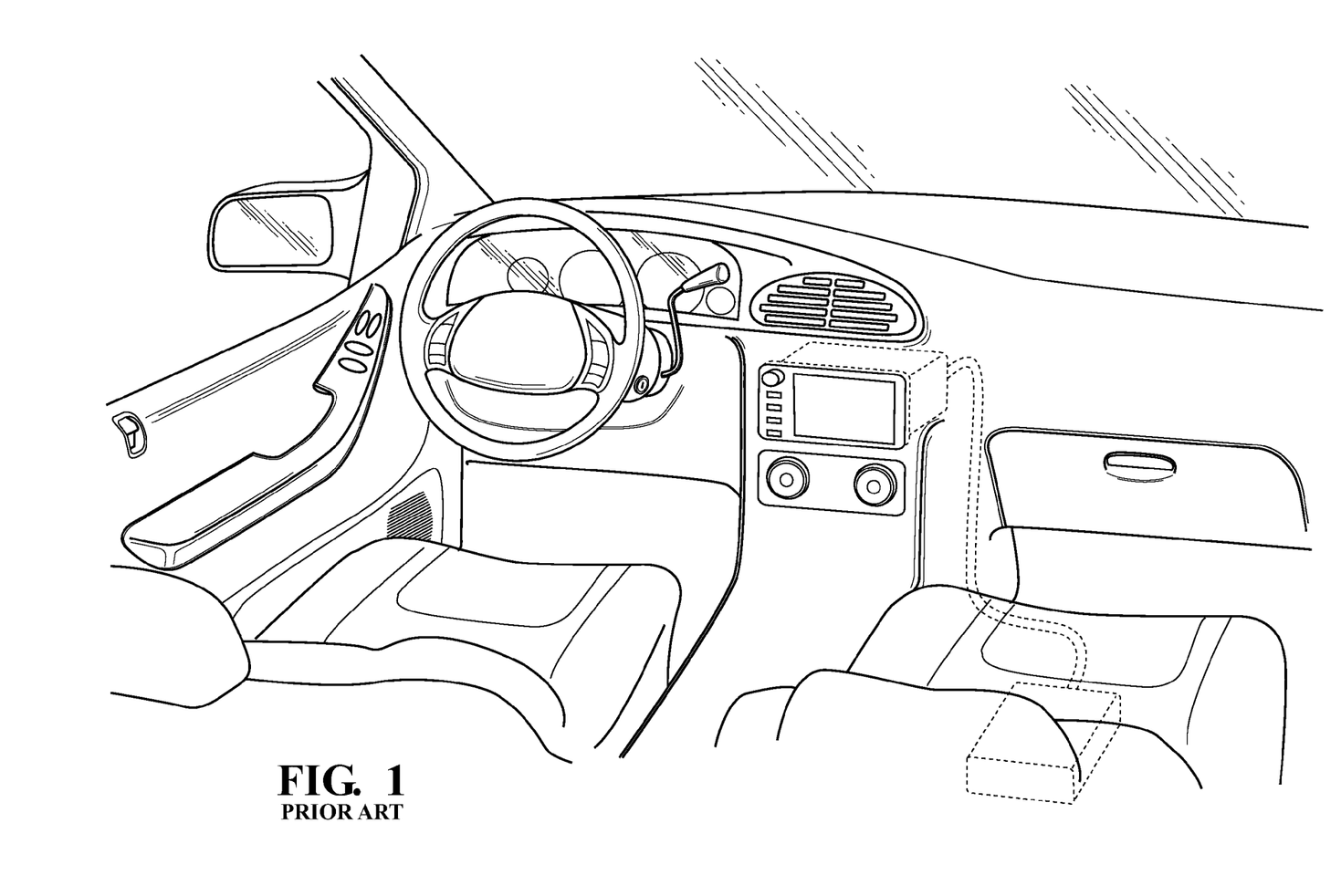
FIG. 1 is a prior art view showing an auxiliary device mounted beneath a front passenger seat of a vehicle.

The auxiliary device includes a housing for storing electrical components necessary to execute the desired functions. As shown in FIG. 1, such auxiliary devices may be mounted underneath a seat of the automotive vehicle. However, for manufacturing purposes such a configuration requires additional manpower and assembly tasks. Accordingly, it remains desirable to have a multimedia assembly which may be easily packaged and assembled into the automotive vehicle so as to reduce assembly time.

SUMMARY OF THE INVENTION

According to one aspect of the invention, a multimedia assembly for use in an automotive vehicle is provided. The multimedia assembly is mounted to an opening of an instrument panel. The multimedia assembly includes a multimedia device and an auxiliary device disposed beneath the multimedia device.

The multimedia device includes a first housing configured to store electrical components operable to execute a plurality of designed functions. The first housing includes a first bottom wall spaced apart a first top wall, a pair of spaced apart first side walls extending between first bottom and top walls, and a first end wall spaced apart a faceplate so as to enclose a space.

The faceplate may include a display screen and a plurality of inputs operable to select and actuate a predetermined number of multimedia functions. The faceplate may include a slot operable to receive a CD or DVD. The faceplate is disposed on an outer surface of the instrument panel. The faceplate is exposed to the cabin space of the automotive vehicle.

The auxiliary device is disposed beneath the multimedia device and hidden behind the outer surface of the instrument panel. The auxiliary device includes a second housing. The second housing includes a second top wall spaced apart a second bottom wall, a pair of spaced apart second side walls extending between second bottom and top walls, and a second end wall spaced apart a second front wall extends between the second top, bottom, and side walls so as to enclose a space.

The second housing of the auxiliary device is configured in dimension to fit beneath a first surface area of the first bottom wall. The second top wall of the second housing includes a second surface area. The first bottom wall of the first housing includes a first surface area. The first surface area is larger than the second area. The first bottom wall includes a first peripheral edge bounding the first surface area and the second top wall includes a second peripheral edge bounding a second surface area. The first peripheral edge extends beyond the second peripheral edge.

A first bracket is operable to attach the auxiliary device to an under surface of the multimedia device. The first bracket may be integrally formed to the auxiliary device and may be mounted onto the under surface of the multimedia device using fasteners such as a screw or a bolt.

A second bracket is operable to attach the multimedia device to the instrumental panel. The second bracket is fixedly mounted to a vehicle body structure. The second bracket supports the multimedia device and auxiliary device in a fixed position with respect to the instrument panel. Thus, accessing the auxiliary device requires the removal of the multimedia device from the second bracket.

Figure 2:
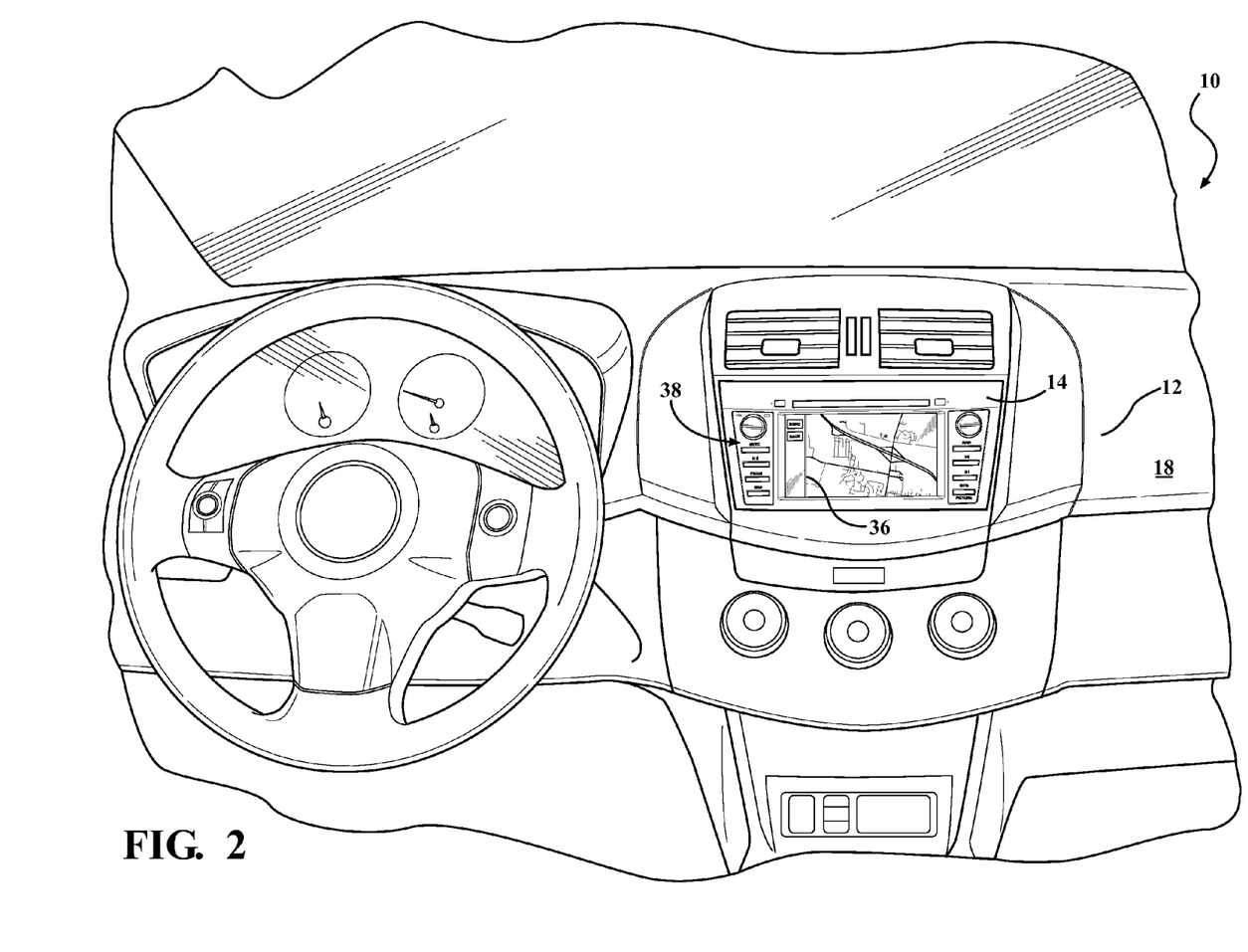
FIG. 2 is a perspective view taken from the cabin of an automotive vehicle showing the instrument panel assembly and the multimedia device mounted to the instrument panel.
Figure 3:
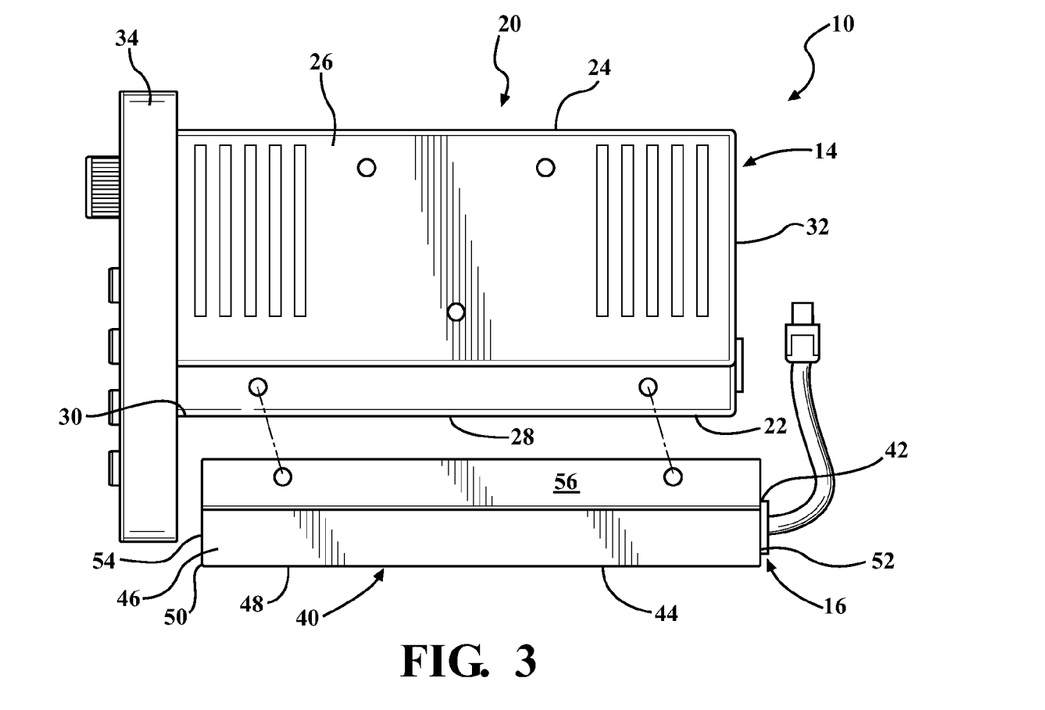
FIG. 3 is an isolated view showing the multimedia device and the auxiliary device.

An instrument panel assembly for use in an automotive vehicle is provided. The instrument panel assembly includes an instrument panel having an outer surface exposed to a cabin space of the automotive vehicle. As shown in FIG. 2, a multimedia device may be disposed on the portion of the instrument panel disposed between the driver and front passenger seat. The multimedia device is operable to provide multimedia function such as AM/FM radio, satellite radio, tele-navigation, and the like.

The instrument panel has an opening configured to receive and fittingly engage the faceplate of the multimedia device so as to place the faceplate on the outer surface of the instrument panel. The remainder of the first housing of the multimedia device is hidden behind the faceplate.

An instrument panel reinforcement bar extends axially between opposing sides of the automotive vehicle. The instrument panel reinforcement bar is disposed above a floor of the automotive vehicle. The instrument panel reinforcement bar provides structural support for the instrument panel.

A pair of spaced apart supports is mounted to the floor of the automotive vehicle. Each support extends from the floor upwardly to the instrument panel reinforcement bar so as to help support the instrument panel reinforcement bar along its axis.

An auxiliary device is mounted beneath the multimedia device, between each of the pair of supports and hidden behind the outer surface of the instrument panel. The auxiliary device is operable to provide additional multimedia function to the multimedia device. For instance, the multimedia device may include electrical components operable to provide web-based applications to the multimedia device. Alternatively, the auxiliary device may include electrical components operable to provide video imaging to the multimedia device.

The instrument panel assembly further includes a first bracket. The first bracket may be integrally formed to the auxiliary device and may extend beyond the second top wall of the auxiliary device so as to provide a surface for mounting onto the side walls of the multimedia device. The first bracket is operable to secure the auxiliary device to the multimedia device.

A second bracket is operable to attach the multimedia device to the instrument panel. The second bracket may be integrally formed to the support. The second bracket is operable to attach the multimedia device to the pair of supports and hold the multimedia device and the attached auxiliary device in a fixed position relative to the opening of the instrumental panel.

BRIEF DESCRIPTION OF THE DRAWINGS

Advantages of the present invention will be readily appreciated as the same becomes understood by reference to the following detailed description when considered in connection with the accompanying drawings wherein.

DETAILED DESCRIPTION OF THE INVENTION

With reference first to FIG. 2, a multimedia assembly 10 mounted to an instrument panel 12 is provided. The multimedia assembly 10 includes a multimedia device 14 and an auxiliary device 16. The multimedia device 14 is operable to provide various multimedia applications and vehicle functions such as navigation, AM/FM radio, satellite radio, and the like. The auxiliary device 16 is operable to provide additional multimedia functions to the multimedia device 14. For instance, the multimedia device 14 may include electrical components operable to execute web-based media applications.

With reference now to FIGS. 3-6, the auxiliary device 16 is mounted beneath the multimedia device 14 and hidden behind the outer surface 18 of the instrument panel 12. The multimedia device 14 includes a first housing 20. The first housing 20 is operable to store electrical components operable to execute predetermined multimedia functions. For instance, the housing may contain a CD player and other electrical components operable to execute or provide AM/FM radio and the like.

The first housing 20 includes a first bottom wall 22 spaced apart a first top wall 24. A pair of spaced apart first side walls 26 extends between the first bottom wall 22 and the first top wall 24. The first bottom wall 22 includes a first surface area 28 bounded by a first peripheral edge 30. A first end wall 32 is spaced apart a faceplate 34. The first end wall 32 and faceplate 34 extend between the first bottom wall 22, the first top wall 24, and the first side walls 26 so as to enclose a space. The space is adaptable to fit various electrical components.

The faceplate 34 is disposed on the outer surface 18 of the instrument panel 12 so as to be exposed to the cabin space of the automotive vehicle. The faceplate 34 may be disposed between the driver and front passenger seat of the vehicle. The faceplate 34 includes a display screen 36 and a plurality of inputs 38. The faceplate 34 may further include a slot operable to receive a readable device such as a CD or a DVD.

The auxiliary device 16 includes a second housing 40. The second housing 40 stores electrical components operable to execute additional multimedia functions. For instance the auxiliary device 16 may include electrical components operable to provide website based multimedia applications to the multimedia device 14 such as music steaming sites currently known as Pandora.

The second housing 40 includes a second top wall 42 spaced apart a second bottom wall 44, a pair of spaced apart second side walls 46 extend between the second bottom wall 44 and the second top wall 42. The second bottom wall 44 includes a second surface area 48 bounded by a second peripheral edge 50. A second end wall 52 is spaced apart a second front wall 54. The second end wall 52 and the second front wall 54 extend between the second bottom wall 44, the second top wall 42 and the second side walls 46 so as to enclose a space.

Figure 5:
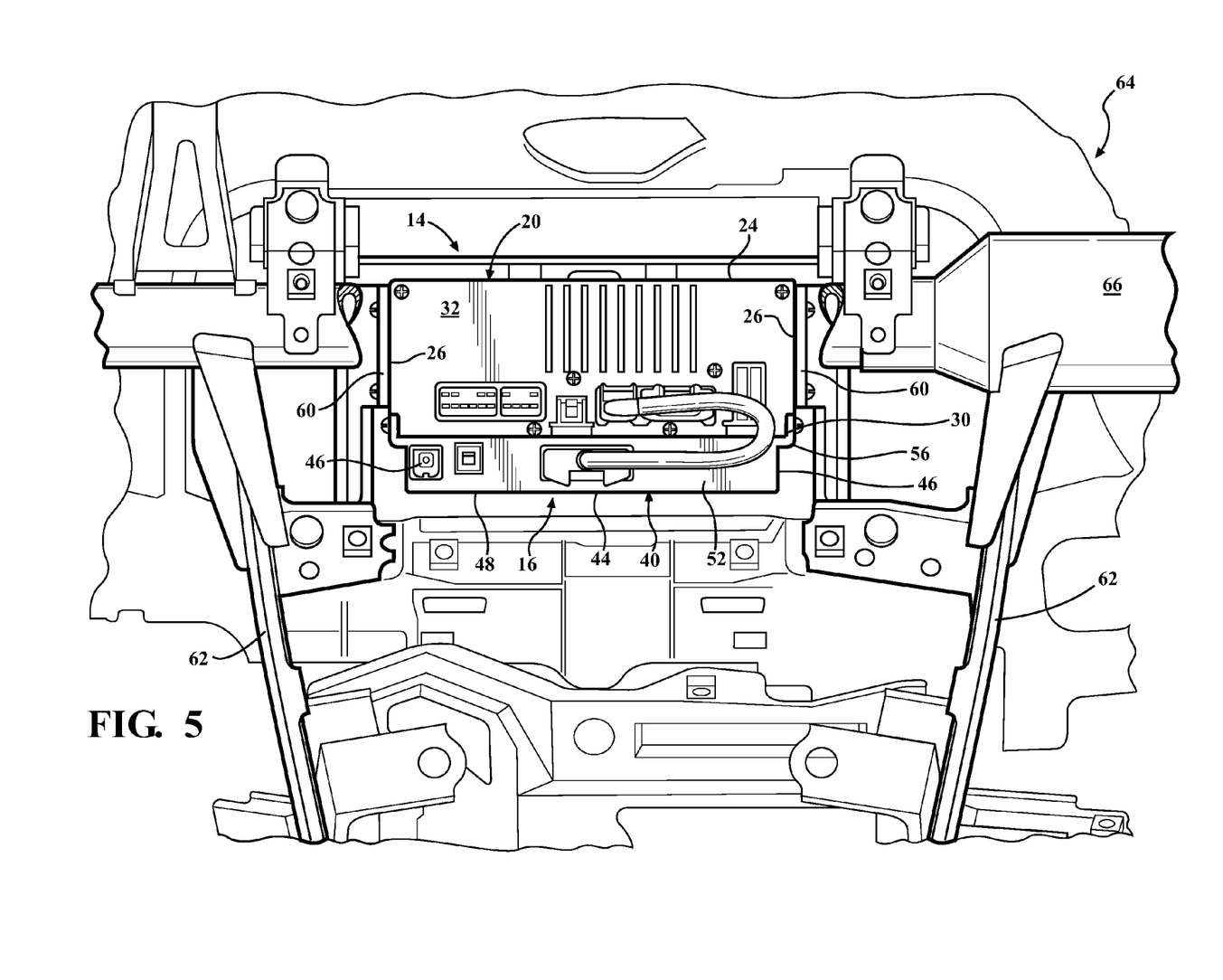
FIG. 5 is a perspective view showing the multimedia device and auxiliary device mounted behind the instrument panel.

The second housing 40 of the auxiliary device 16 is configured in dimension to fit beneath a first surface area 28 of the first bottom wall 22. As shown in FIG. 5, the first surface area 28 is larger than the second surface area 48 so as to fit the auxiliary device 16 within the area defined by the first peripheral edge 30.

A first bracket 56 is operable to attach the auxiliary device 16 to an under surface of the multimedia device 14. The first bracket 56 is made of a durable and rigid material such as steel. The first bracket 56 may be integrally formed to opposing second side walls 46 of the auxiliary device 16. For illustrative purposes the first bracket 56 is shown extending above the plane of the second top wall 42 of the auxiliary device 16 and includes a pair of apertures.

Figure 4:
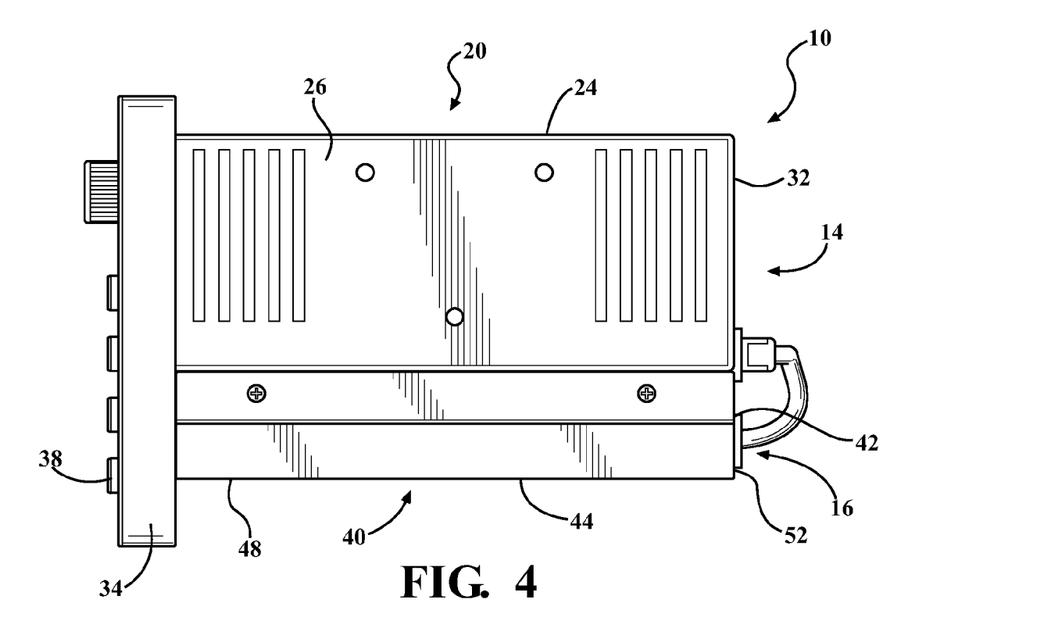
FIG. 4 is a perspective side view showing the auxiliary device mounted to the under surface of the multimedia device.

The multimedia device 14 includes a pair of threaded apertures adjacent the first bottom wall 22 and disposed on respective first side walls 26 of the first housing 20. The threaded apertures are registered to receive the opening 58 of the first bracket 56 so as to place the second top wall 42 of the auxiliary device 16 in contact with the first bottom wall 22 of the multimedia device 14. The auxiliary device 16 may be attached to the multimedia device 14 by aligning the respective apertures and using known fasteners illustratively including a screw. Thus as shown in FIG. 4, the auxiliary device 16 is attached to the multimedia device 14 and disposed underneath the multimedia device 14.

A second bracket 60 is operable to attach the multimedia device 14 to the instrumental panel. The second bracket 60 is fixedly mounted to a vehicle body structure. The second bracket 60 supports 62 the multimedia device 14 and auxiliary device 16 in a fixed position with respect to the instrument panel 12. Thus, accessing the auxiliary device 16 requires the removal of the multimedia device 14 from the second bracket 60.

Figure 7:
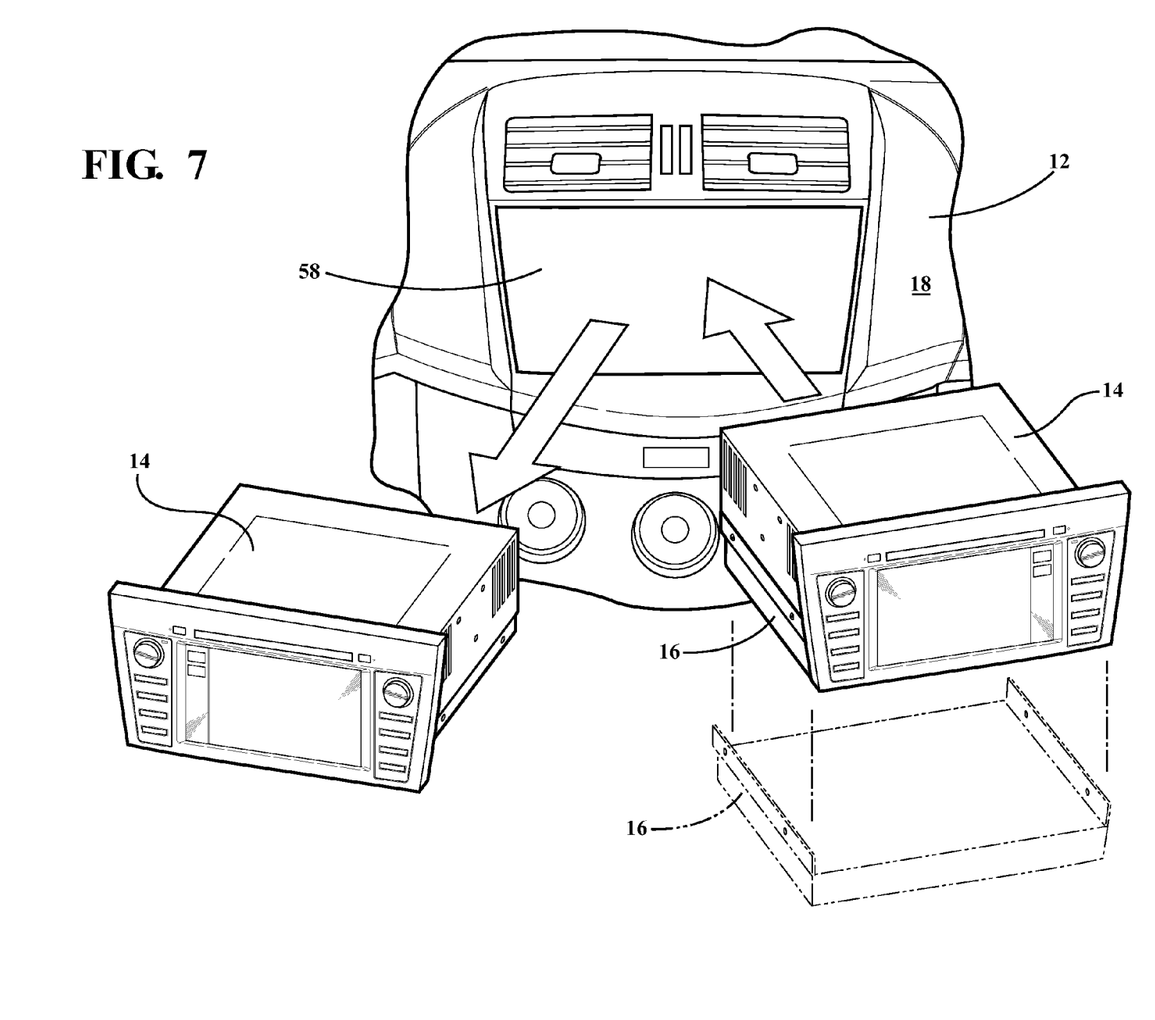
FIG. 7 is a perspective view showing how the multimedia device and auxiliary device may be integrated into the instrument panel assembly.

An instrument panel assembly 64 for use in an automotive vehicle is provided. The instrument panel assembly 64 includes an instrument panel 12 having an outer surface 18 exposed to the cabin space of the automotive vehicle as shown in FIG. 2. The instrument panel 12 includes an opening 58 adapted to receive a multimedia device 14 and an auxiliary device 16 as shown in FIG. 7.

With reference now to FIG. 5, the instrument panel assembly 64 includes an instrument panel reinforcement bar 66. The instrument panel reinforcement bar 66 extends between opposing sides of the automotive vehicle and is formed of a durable and rigid material such as steel. The instrument panel reinforcement bar 66 extends along an axis and is generally disposed above a floor of the automotive vehicle.

A pair of spaced apart supports 62 is operable to support the instrument panel reinforcement bar 66 along its axis. The supports 62 are formed of a durable and rigid material such as steel. Each support 62 is spaced apart from each other and includes a top end portion and a bottom end portion. The bottom end portion is rigidly mounted to the floor of the automotive vehicle. The top end portion is fixedly attached to the instrument panel reinforcement bar 66.

The multimedia device 14 includes a first housing 20. The first housing 20 is operable to store electrical components operable to execute predetermined multimedia functions. For instance, the first housing 20 may contain a CD player and other electrical components operable to execute or provide AM/FM radio and the like.

The first housing 20 includes a first bottom wall 22 spaced apart a first top wall 24. The first bottom wall 22 includes a first surface area 28 bounded by a first peripheral edge 30. A pair of spaced apart first side walls 26 extends between the first bottom wall 22 and the first top wall 24. A first end wall 32 is spaced apart a faceplate 34. The first end wall 32 and the faceplate 34 extend between the first bottom wall 22, the first top wall 24, and the first side walls 26 so as to enclose a space.

The faceplate 34 is disposed on the outer surface 18 of the instrument panel 12, so as to be exposed to the cabin space of the vehicle. The faceplate 34 may be disposed between the driver and front passenger seat of the vehicle. The faceplate 34 includes a display screen 36 and a plurality of inputs 38.

The auxiliary device 16 includes a second housing 40. The second housing 40 stores electrical components operable to execute additional multimedia functions. The second housing 40 includes a second top wall 42 spaced apart a second bottom wall 44. The second bottom wall 44 includes a second surface area 48 bounded by a second peripheral edge 50. A pair of spaced apart second side walls 46 extends between the second bottom wall 44 and the second top wall 42. A second end wall 52 is spaced apart a second front wall 54. The second end wall 52 and second front wall 54 extend between the second top wall 42, second bottom wall 44, and the second side walls 46 so as to enclose a space.

The second housing 40 of the auxiliary device 16 is configured in dimension to fit beneath a first surface area 28 of the first bottom wall 22. As shown in FIG. 5, the first surface area 28 is larger than the second surface area 48 so as to fit the auxiliary device 16 within the area defined by the first peripheral edge 30.

A first bracket 56 is operable to attach the auxiliary device 16 to an under surface of the multimedia device 14. The first bracket 56 is made of a durable and rigid material such as steel. The first bracket 56 may be integrally formed to opposing second side walls 46 of the auxiliary device 16. For illustrative purposes the first bracket 56 is shown extending above the plane of the second top wall 42 of the auxiliary device 16 and includes a pair of apertures.

The multimedia device 14 includes a pair of threaded apertures adjacent the first bottom wall 22 and disposed on respective first side walls 26 of the first housing 20. The threaded apertures are registered to receive the opening 58 of the first bracket 56 so as to place the second top wall 42 of the auxiliary device 16 in contact with the first bottom wall 22 of the multimedia device 14. The auxiliary device 16 may be attached to the multimedia device 14 by aligning the respective apertures and using known fasteners illustratively including a screw. Thus as shown in FIG. 4, the auxiliary device 16 is attached to the multimedia device 14 and disposed underneath the multimedia device 14.

Figure 6:
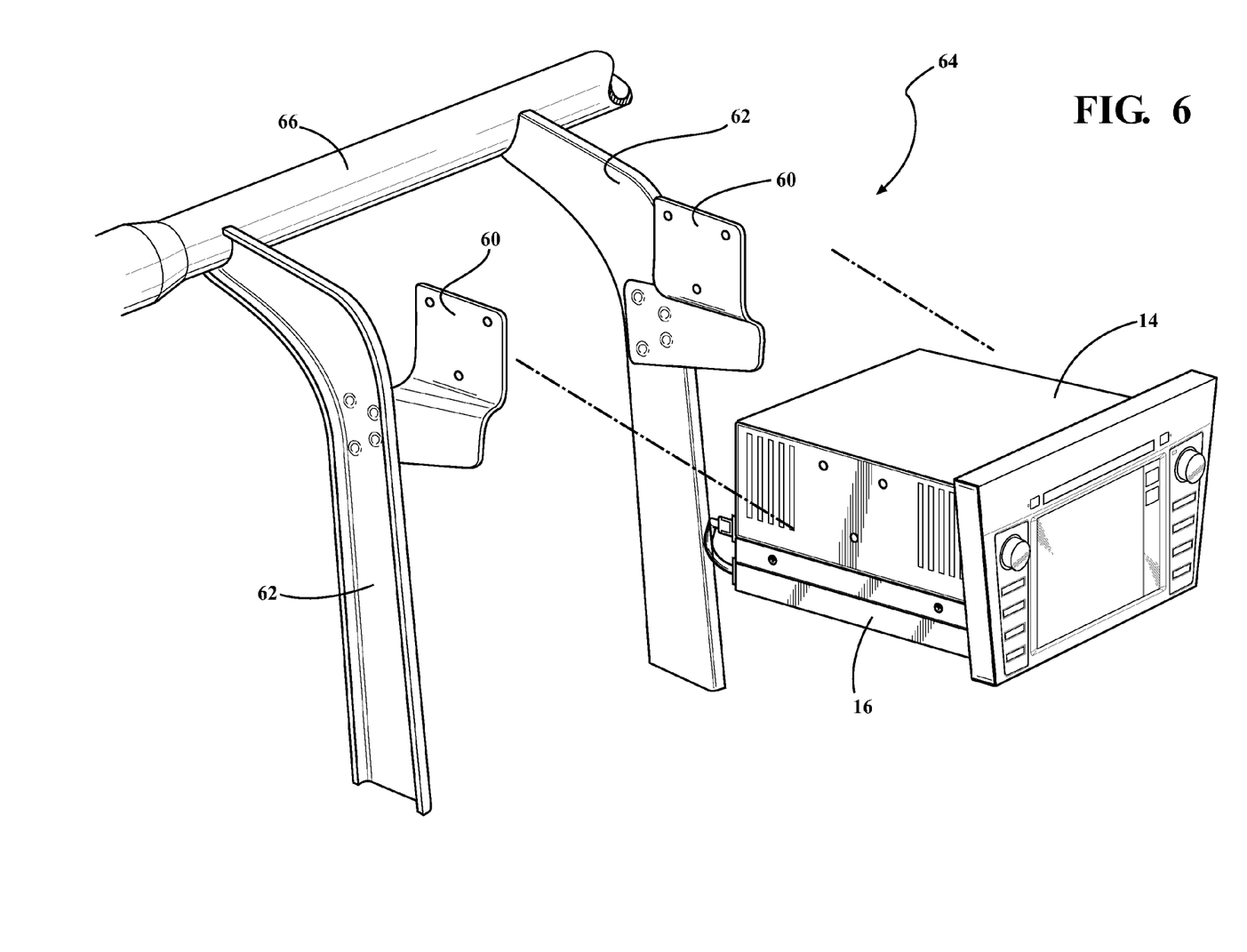
FIG. 6 is a perspective view showing the multimedia device as it is ready to be attached to the supports.

With reference now to FIG. 6, a second bracket 60 is operable to attach the multimedia device 14 to the instrument panel 12. The second bracket 60 is formed from a durable and rigid material such as steel. The second bracket 60 is attached to a support 62 and extends longitudinally from one support 62 towards another support 62.

For illustrative purposes, the instrument panel assembly 64 is shown having a pair of second brackets 60 each disposed on respective supports 62. As shown in FIG. 5, each of the second brackets 60 is fastened to a back side of the faceplate 34 and includes an aperture adapted to receive a screw so as to secure the multimedia device 14 to the supports 62 thus holding the multimedia device 14 in a fixed position with respect to the opening 58 of the instrument panel 12.

With reference again to FIGS. 6 and 7, the installation of the multimedia device 14 and auxiliary device 16 is provided. The multimedia device 14 and the auxiliary device 16 may be attached together and delivered to the automotive manufacturer as a single unit. Thus integration of the multimedia device 14 and auxiliary device 16 into the assembly of an automotive vehicle is relatively simple as the multimedia device 14 and auxiliary device 16 arrive at the manufacturing plant as a single packaged unit.

The multimedia device 14 and attached auxiliary device 16 may then be mounted onto the vehicle using existing brackets 56, 60 previously designed to attach the multimedia device 14 to the respective opening 58 of the instrument panel 12. Further, updating existing multimedia devices 14 with additional media functions may be done without having to reconfigure the vehicle. Specifically, the automotive manufacturer may simply remove the current multimedia device 14, attach the auxiliary device 16 to the first bottom wall 22, and insert the multimedia device 14 into the opening 58 of the instrument panel 12 and secure the multimedia device 14 and attached auxiliary device 16 using the existing brackets 56, 60 and fasteners. Further, packaging space for the vehicle is maximized. Specifically, the typical spaces such as the space underneath the front passenger seat remain available for use for other electrical components.

Obviously many modifications and variations of the present invention are possible in light of the above teachings and may be practiced otherwise than as specifically described while within the scope of the appended claims.

| ELEMENT LIST | |
| --- | --- |
| Element Symbol | Element Name |
| 10 | multimedia assembly |
| 12 | instrument panel |
| 14 | multimedia device |
| 16 | auxiliary device |
| 18 | outer surface |
| 20 | first housing |
| 22 | first bottom wall |
| 24 | first top wall |
| 26 | first side walls |
| 28 | first surface area |
| 30 | first peripheral edge |
| 32 | first end wall |
| 34 | faceplate |
| 36 | display screen |
| 38 | inputs |
| 40 | second housing |
| 42 | second top wall |
| 44 | second bottom wall |
| 46 | second side walls |
| 48 | second surface area |
| 50 | second peripheral edge |
| 52 | second end wall |
| 54 | second front wall |
| 56 | first bracket |
| 58 | opening |
| 60 | second bracket |
| 62 | supports |
| 64 | instrument panel assembly |
| 66 | instrument panel reinforcement bar |

The invention claimed is:

1. A multimedia assembly for use in an automotive vehicle, the multimedia assembly disposed within a cabin space of the automotive vehicle, the cabin space enclosed in part by a windshield, the multimedia assembly configured to provide a predetermined multimedia function, the multimedia assembly comprising:
an instrument panel having a surface exposed to the cabin space, the instrument panel disposed beneath the windshield;
a multimedia device having a faceplate and a first housing, the faceplate disposed on an outer surface of the instrument panel, the first housing disposed behind the faceplate, the first housing having a first side wall, and a bottom wall, the bottom wall having a first surface area;
a first bracket attached to the first side wall of the first housing; and
an auxiliary device, the auxiliary device having a second housing, the second housing holding electrical components configured to provide additional multimedia function through the multimedia assembly; the second housing of the auxiliary device is also attached to the first bracket so as to be mounted below the multimedia device, behind the faceplate and hidden behind the outer surface of the instrument panel.

2. The multimedia assembly as set forth in claim 1, further including a second bracket, the second bracket operable to attach the multimedia device to the instrument panel.

3. The multimedia assembly as set forth in claim 1, wherein the second housing of the auxiliary device has a top wall, the top wall having a second surface area, wherein the top wall is in contact with the bottom wall of the first housing.

4. The multimedia assembly as set forth in claim 3, the first surface area is larger than the second surface area.

5. The multimedia assembly as set forth in claim 3, wherein the bottom wall includes a first peripheral edge bounding the first surface area, the top wall includes a second peripheral edge bounding a second surface area.

6. An instrument panel assembly for use in an automotive vehicle, the instrument panel assembly comprising:
an instrument panel having an outer surface exposed to a cabin space of the automotive vehicle;
an instrument panel reinforcement bar extending axially between opposing sides of the automotive vehicle and disposed above a floor of the automotive vehicle;
a pair of spaced apart supports, each of the supports mounted to the floor of the automotive vehicle and supporting the instrument panel reinforcement bar;
a multimedia device having a faceplate and a first housing, the faceplate disposed on an outer surface of the instrument panel, the first housing disposed behind the faceplate, the first housing having a first side wall, and a bottom wall, the bottom wall having a first surface area;
a first bracket attached to the first side wall of the first housing; and
an auxiliary device disposed between the pair of supports, the auxiliary device having a second housing, the second housing holding electrical components configured to provide additional multimedia function through the multimedia device; the second housing of the auxiliary device is also attached to the first bracket so as to be mounted below the multimedia device, behind the faceplate, and hidden behind the outer surface of the instrument panel.

7. The instrument panel assembly as set forth in claim 6, further including a second bracket, the second bracket operable to attach the multimedia device to the instrument panel.

8. The instrument panel assembly as set forth in claim 7, wherein the second bracket is fixedly formed to one of the pair of supports.

9. The instrument panel assembly as set forth in claim 3, wherein the first surface area of the bottom wall is larger than the second surface area of the top wall.

10. The instrument panel assembly as set forth in claim 9, wherein the bottom wall includes a first peripheral edge bounding the first surface area, the top wall includes a second peripheral edge bounding a second surface area.

* * * * *